United States Patent
Zimmermann et al.

(10) Patent No.: US 12,045,625 B2
(45) Date of Patent: Jul. 23, 2024

(54) METHOD FOR OPERATING AN ELECTRONIC DATA PROCESSING SYSTEM AND ELECTRONIC DATA PROCESSING SYSTEM

(71) Applicant: Mettler-Toledo (Albstadt) GmbH, Albstadt (DE)

(72) Inventors: Alexander Zimmermann, Balingen (DE); Denis Huber, Albstadt (DE); Werner Engeln, Dettenhausen (DE); Walter Ehresmann, Albstadt (DE); Jaron Krimmel, Albstadt (DE); Alexander Hecht, Albstadt (DE); Janik Quarleiter, Stetten am kalten Markt (DE); Edgar Kempf, Inzigkofen (DE)

(73) Assignee: Mettler-Toledo (Albstadt) GmbH, Albstadt (DE)

( * ) Notice: Subject to any disclaimer, the term of this patent is extended or adjusted under 35 U.S.C. 154(b) by 438 days.

(21) Appl. No.: 17/303,334

(22) Filed: May 27, 2021

(65) Prior Publication Data
US 2021/0373909 A1  Dec. 2, 2021

(30) Foreign Application Priority Data
May 27, 2020 (EP) .................... 20176750

(51) Int. Cl.
G06F 9/44 (2018.01)
G06F 9/4401 (2018.01)
(Continued)

(52) U.S. Cl.
CPC .......... *G06F 9/4408* (2013.01); *H04L 9/0825* (2013.01); *H04L 9/3215* (2013.01); *H04L 9/3242* (2013.01); *H04L 9/3271* (2013.01)

(58) Field of Classification Search
CPC ............... G06F 1/26; G06F 1/32; G06F 9/455
See application file for complete search history.

(56) References Cited

U.S. PATENT DOCUMENTS

| 6,810,355 B1 | 10/2004 | Kreidler et al. |
| 7,552,476 B2 | 6/2009 | Slick et al. |

(Continued)

FOREIGN PATENT DOCUMENTS

| EP | 1450144 A2 | 8/2004 |
| EP | 2284506 B1 | 2/2018 |

*Primary Examiner* — Phil K Nguyen
(74) *Attorney, Agent, or Firm* — Standley Law Group LLP; Jeffrey S. Standley; Adam J. Smith

(57) ABSTRACT

A method is disclosed for operating an electronic data processing system (10) operable under an operating system. The electronic data processing system has a boot system (13) for selectively loading an operating system from one of a plurality of storage media (12, 30). The boot system is accessible to an external user after the user executes an identification protocol with the boot system. The identification protocol is a challenge-response protocol based on a challenge generated by the boot system. More particularly, the challenge is randomly generated by the boot system and communicated to the user in an outgoing message and the user generates a response to the challenge as an incoming message to the boot system. A specific application is related to an electronic data processing system, and to a weighing scale (1), where the authentication system includes the electronic data processing system.

18 Claims, 3 Drawing Sheets

(51) Int. Cl.
*H04L 9/08* (2006.01)
*H04L 9/32* (2006.01)

(56) References Cited

U.S. PATENT DOCUMENTS

| | | | |
|---|---|---|---|
| 7,895,443 | B2 | 2/2011 | Grove et al. |
| 8,412,865 | B2 | 4/2013 | Poo et al. |
| 9,009,454 | B2 | 4/2015 | Martinez et al. |
| 9,317,275 | B2 * | 4/2016 | Lee ................... G06F 9/445 |
| 10,146,706 | B2 | 12/2018 | Bolotin et al. |
| 10,313,333 | B2 | 6/2019 | Ibrahim et al. |
| 2003/0235305 | A1 | 12/2003 | Hsu |
| 2004/0236997 | A1 | 11/2004 | Poo |
| 2008/0010446 | A1 * | 1/2008 | Kim ................... G06F 9/441 |
| | | | 713/2 |
| 2009/0262940 | A1 * | 10/2009 | Lim ................... G06F 21/78 |
| | | | 713/189 |
| 2011/0302421 | A1 | 12/2011 | Harrison et al. |
| 2012/0017097 | A1 * | 1/2012 | Walrath ............. G06F 12/14 |
| | | | 713/190 |
| 2013/0339718 | A1 * | 12/2013 | Kanaya ........... G06F 11/3688 |
| | | | 713/2 |
| 2017/0169226 | A1 * | 6/2017 | Rajcan ................. G06F 9/442 |
| 2018/0293407 | A1 * | 10/2018 | Wu ..................... G06F 21/602 |
| 2018/0365427 | A1 * | 12/2018 | Callaghan ........... H04L 9/3247 |
| 2018/0373881 | A1 * | 12/2018 | Thom ................. H04L 9/0643 |
| 2019/0289038 | A1 * | 9/2019 | Li ....................... H04L 9/3215 |
| 2019/0370006 | A1 * | 12/2019 | Silva .................. G06F 21/575 |
| 2022/0188421 | A1 * | 6/2022 | Flett ................... G06F 21/33 |

* cited by examiner

METHOD FOR OPERATING AN ELECTRONIC DATA PROCESSING SYSTEM AND ELECTRONIC DATA PROCESSING SYSTEM

CROSS-REFERENCE TO RELATED APPLICATIONS

This application claims the benefit of priority to European patent application EP 20176750.6, filed on 27 May 2020, which is incorporated by reference as if fully recited herein.

TECHNICAL FIELD

The invention relates to a method for operating an electronic data processing system operable under an operating system, the electronic data processing system comprising a boot system for selectively loading an operating system from one of a plurality of storage media, the boot system being accessible to an external user on execution of an identification protocol between the boot system and the user.

Furthermore, the invention relates to an electronic data processing system, and to a weighing scale and an authentication system comprising the electronic data processing system.

BACKGROUND

Electronic data processing systems are generally equipped with an operating system, i.e. a software managing the different hardware and software components of the electronic data processing system. After switching on the central processing unit of the electronic data processing system, the operating system must be loaded in the main memory by the boot system. For example, in the case of a personal computer the operating system may be booted from an internal storage medium of the computer, like a hard disk or a Solid State Drive (SSD). Alternatively, the operating system may be booted from an external storage medium connected to an interface of the computer, e.g., a Universal Serial Bus (USB) port or a Thunderbolt interface. For example, the operating system may be booted from a USB-stick connected to a USB-port of the computer. A user may select the storage medium from which the boot system is loading the operating system, or he may change the boot order by pressing a certain key on a keyboard of the computer during starting of the computer.

With the progress of information processing technology, the use of electronic data processing systems in public spaces has become more and more popular. This may include devices like weighing scales, point-of-sales terminals, info terminals, small single board computers and electronic displays, to name just a few examples. Very often these devices are provided with external hardware interfaces, like USB-ports. These interfaces may be used, among others, for the connection of keyboards or printers. Furthermore, the USB-ports allow to transfer data to and from an external storage medium, like a USB-stick, connected to a USB-port.

Due to the possibility to easily transfer data to and from an external storage medium these hardware interfaces and the external storage media present a potential security problem.

In case that the external storage medium, e. g. a USB-stick, gets lost or stolen the data stored on the external storage medium must be protected, e. g. in a way explained in U.S. Pat. No. 10,146,706 B2.

When an electronic data processing system is used in a public environment the hardware interfaces mentioned above may present a potential "open safety door". It is thus necessary to protect the data on the electronic data processing system against unauthorized access during the operation of the system, as it is explained e. g. in EP 1 450 144 A2 and in U.S. Pat. No. 6,810,355 B1 for a weighing scale. Furthermore, it may be necessary to limit the access to the data on the electronic data processing system by implementing an authentication protocol during its boot process, as it is explained e. g. in US 2008/0222718 A1.

Another security problem arises during boot time, since the boot system might load an operating system from an external storage medium, e. g. a USB-stick connected to a USB-port, as explained above. Such an operating system may intentionally or unintentionally contain malware or viruses, and may thus damage the electronic data processing system.

For example, an electronic data processing system might be included in a self-service scale or a cash register used in a supermarket. These scales are generally provided with a USB-port. A potential attacker entering the supermarket has direct access to the self-service scale or cash register. The attacker can then insert a USB-stick with an operating system and boot from it in a few seconds. After the boot, an attack to the network of the supermarket or directly to the scale or cash register may be started and software and data may be uploaded or downloaded. In such a scenario, the attacker may stop the business of the supermarket for hours, days or longer, or he may steal relevant data.

In another example, a company might provide IT-services for their products, including the installation of new software from an external storage medium, for example a USB-stick connected to a USB-port. An employee of the company might have the idea to start his own IT-service business and use his knowledge to image existing products with new images by booting from an external storage medium.

Thus, it is important to find a way to prevent unauthorized booting from an external storage medium.

A known solution to this problem is to disable the hardware interface. For example, USB-ports may be permanently blocked by using epoxy, or they may be reversibly blocked via a mechanical lock. This solution is however not very safe, as the keys for the mechanical lock might get lost. Furthermore, providing the keys is expensive. Alternatively, one might use an electronic lock. This requires additional hardware which is expensive, and a software unlock system, which is not very safe.

A further known solution is proprietary memory means, like a proprietary USB stick. However, this setup requires a special hardware and software, and has too many manipulation possibilities.

EP 2 284 506 B1 proposes to associate a given removable storage medium with a measurement device and to check, in particular at the start of the measurement device, whether a removable storage medium connected to said measurement device is the associated device. This precludes, however, the use of a non-associated storage medium with the measurement device so that this approach is not very flexible.

Another known possibility is secure boot which is a protocol securing the boot process by preventing the loading of drivers or operating system loaders that are not signed with an acceptable digital signature. As secure boot checks each software component, it is unfeasible for a system having many components from various suppliers.

Alternatively, one may use a Trusted Platform Module which is a security function on an additional chip that is used to authenticate hardware devices. However, such a chip is expensive.

A different approach is the use of an identification protocol between the boot system and the user. A simple and known example of such an identification protocol is password protection of the boot system, e. g. in the form of a password protection of the Basic Input/Output System (BIOS) or the Unified Extensible Firmware Interface (UEFI). However, such passwords provide only weak protection, as the password may be known by many people, e. g. supermarket staff, technicians, etc. Sometimes BIOS or UEFI passwords are even publicly available on the internet.

The disclosed invention was made in view of the above-mentioned problems, and it is an object of the present invention to further develop a method for operating the electronic data processing system mentioned above which is secure, easy to use and cheap, and to provide an electronic data processing system, and a weighing scale and an authentication system comprising the electronic data processing system.

SUMMARY

According to the present invention, this object is attained in that said identification protocol is a challenge-response protocol based on a challenge generated by said boot system, more particularly, based on a challenge randomly generated by said boot system, and communicated to said user in an outgoing message, and on verification of a response generated by said user on the basis of said challenge and received by said boot system as an incoming message generated by said user.

According to the present invention, there is provided a method for operating an electronic data processing system operable under an operating system. The electronic data processing system may comprise a Central Processing Unit (CPU) and a memory. The electronic data processing system may comprise an x86 processor, an ARM (Advanced RISC Machine) processor or any other known processor. An operating system is loaded in the memory by a boot system at starting of the electronic data processing system. The boot system may comprise a BIOS or an UEFI stored in a non-volatile memory of the electronic data processing system.

The electronic data processing system may be included in a personal computer. The electronic data processing system may be included in or may be connected with a device like a weighing scale, a point-of-sales terminal, a kiosk, an info terminal, a display, etc., and may be operative to control the operation of said device.

The boot system may load the operating system from one of a plurality of storage media. There may be two, three, or more storage media which are accessible to the boot system. For example, one operating system may be stored on an internal storage medium of the electronic data processing system, like a hard drive or a SSD, and another operating system may be stored on an external storage medium which is connectable to said electronic data processing system via a hardware interface. For example, the hardware interface may be a USB-port, and the external storage medium may be a USB-stick or other memory means connectable to the USB-port.

The boot system is accessible to an external user on execution of an identification protocol between said boot system and said user. Once the user has accessed said boot system, he may select the storage medium from which the operating system is loaded. For example, the user may select that the operating system is loaded from an external storage medium or from an internal storage medium. For example, the user may select that the operating system is loaded from a USB-stick connected to a USB-port of the electronic data processing system.

The boot system may be accessible at starting of the electronic data processing system. To access the boot system, the user may, for example, press a key on a keyboard or touch an icon on a touch screen in communication with said electronic data processing system.

Accessibility of the boot system may include access to any function of the boot system. Alternatively, access to the boot system may include access to only a subset of functions of the boot system. For example, when having access to the boot system the user may be able to change the boot sequence and/or he may be able to enable or disable loading the operating system from certain storage media. E. g., the user may be able to enable or disable the USB-port of the electronic data processing system, thereby enabling or disabling the possibility to load an operating system from a storage medium connected to said USB-port.

According to the present invention, the identification protocol is a challenge-response protocol between the boot system and the user. The idea of a challenge-response protocol is that the user may prove his identity to the boot system by demonstrating knowledge of a secret associated with the user without revealing the secret itself (see e. g. U.S. Pat. No. 7,552,476 B2, US 2011/0302421 A1 and U.S. Pat. No. 10,313,333 B2). To this end, the user must present a response to a challenge generated by the boot system. In this respect, the boot system may be denoted as "verifier", while the user may be denoted as "claimant".

At starting of the protocol, the challenge is generated by the boot system. The challenge may be randomly generated by said boot system. The challenge may be generated on the basis of a fresh random number. In the context of a challenge-response protocol, "fresh" means recent, in the sense of having originated subsequent to the beginning of the current protocol instance.

The random number may be generated by a random number generator implemented in said boot system. For example, the random number generator may be implemented in said BIOS or UEFI of the boot system.

Alternatively, the challenge may be generated by a quasi-random method. For example, the challenge may be generated based on a time value, for example a system time of the boot system. Alternatively, the challenge may be generated by randomly or quasi-randomly choosing a value from a challenge table.

The challenge may be represented by a random bit string. For example, the challenge may be represented by the random number generated by the random number generator. The challenge may be represented by a string. The challenge may be represented by a string of numbers and/or letters.

Next, the challenge is communicated to said user in an outgoing message. The outgoing message may be communicated via data output means in communication with the boot system. The data output means may comprise a display connected with the boot system. Then, the challenge may be presented to the user on the display in human readable form. For example, the challenge may be represented by the generated random number which is displayed on the display. The challenge may e. g. be represented as a nine-digit random number. Alternatively, the challenge may be represented as a barcode or a QR code displayed on the display.

The data output means may comprise voice output means. The data output means may comprise an electronic data communication channel, for example near-field communication (NFC), Bluetooth, wireless LAN, USB, USB On-The-Go, etc., and the challenge may be communicated to the user via this channel.

Upon receiving the challenge, the user generates a response to said challenge. To this end, the user may use response generation means. The response generation means may use electronic data processing to generate the response. The response is generated in a way which allows authentication of the user. The response may be displayed on a display associated with the user. The response may be represented as a bit string, e. g. a sequence of numbers. For example, the response may be represented as a six-digit number. Alternatively, the response may be represented as a bar code or a QR code displayed on the display.

The response is received by the boot system as an incoming message. The incoming message may be received via data input means connected with the boot system. For example, the data input means may comprise a keyboard or a touch screen for inputting the response. The data input means may comprise voice input means. The data input means may comprise an electronic data communication channel, for example near-field communication (NFC), Bluetooth, wireless LAN, USB, USB On-The-Go, etc., for receiving the incoming message generated by the user.

Once the boot system has received the response, the boot system verifies whether the received response is the correct response to said challenge. If the response is correct, the access to the boot system is granted. As explained above, the user may then have access to any function of the boot system. Alternatively, he may have access to only a subset of functions of the boot system.

If the response is not correct, access to the boot system is denied. Then, it may be possible that the boot system generates another challenge and the identification protocol is repeated. The number of times the identification protocol is repeated after an incorrect response is received by the boot system may be limited to a certain number before no further challenge is generated. Then, a reset may be necessary by an administrator before a new challenge may be generated. Alternatively, access to the boot system may be blocked for a predetermined period of time before a new random number may be generated. This may improve the security of the identification protocol.

Possible embodiments of the challenge-response protocol will be further specified below.

The challenge may be communicated to the user in an encrypted form. Additionally, or alternatively, the response may be communicated to the boot system in an encrypted form.

The method according to the present invention uses a challenge-response protocol for identification of a user. In this way, a one-time password is generated each time the identification protocol is carried out. This improves the security of the authentication method compared to known methods. The method is cheap, as there are no license fees or additional hardware costs. There is no dependence from additional tools produced by external suppliers. Furthermore, the method is independent of the used hardware and is thus universal. The method is easy to use, and it is easy to manage the access rights.

In one embodiment of the method according to the present invention said challenge may be generated by using electronic data processing to execute a challenge generation algorithm implemented in said boot system. Said challenge generation algorithm may be implemented in the BIOS or UEFI of said boot system. Said challenge generation algorithm may comprise a random number generator.

Additionally, or alternatively, said response may be generated by using electronic data processing to execute a response generation algorithm implemented in electronic response generation means operable by the user. Said response generation means may be a personal computer, a laptop computer, a tablet, a smartphone or any other electronic data processing means. This approach is very practical, since a user can easily carry a portable electronic data processing means.

Additionally, or alternatively, said verification may be by using electronic data processing to execute a verification algorithm implemented in said boot system. Said verification algorithm may be implemented in the BIOS or UEFI of said boot system. The implementation of the method by using algorithmic techniques and electronic data processing is very user friendly.

In one embodiment of the present invention said challenge-response protocol may be based on symmetric-key techniques. In one embodiment of the method according to the present invention said challenge-response protocol may be based on a symmetric key shared between said boot system and said user. On the side of the verifier, the key may be stored in said boot system, for example in said BIOS or UEFI. On the side of the claimant, the key may be stored in the response generation means.

In one embodiment, said challenge-response protocol may be based on a one-way function accepting said challenge and said shared symmetric key as an input. Said one-way function may be a Keyed-Hash Message Authentication Code (HMAC). Said HMAC may involve a cryptographic hash function, such as SHA-256. Other cryptographic hash functions may be used as well. Such an approach is very safe, since it is technically impossible to learn the challenge given the response calculated by a given HMAC.

One possibility to implement a symmetric-key based challenge-response protocol may be as follows: The challenge is generated by the boot system. For example, the challenge may be randomly generated by the boot system. The challenge may be represented as a random number generated by the boot system. The random number may be communicated to the user. The user may use a HMAC or another one-way function and the shared secret key to generate the response which is the functional value of the HMAC (or one-way function) given the secret key and the challenge as the input. The response is communicated to the boot system. The boot system uses the same HMAC (or one-way function) as the user and the shared secret key to generate a verification value which is the functional value of the HMAC (or one-way function) given the secret key and the challenge as the input. When the user and the boot system indeed share the same secret key the response is identical to the verification value. If, on the other hand, the user is not in possession of the shared secret key, it is impossible for him to generate a response which is identical to the verification value.

Alternatively, said symmetric-key techniques may be based on symmetric-key encryption known in the art.

According to another example of the method according to the present invention, the challenge-response protocol may be based on public-key techniques. Said challenge-response protocol may be based on a pair of asymmetric keys, one of the keys being a public key accessible to said boot system and the other one being a private key used for the generation of the response. The protocol may be based on public-key decryption or on digital signatures, as known in the art.

To ensure the security of the challenge-response protocol it is crucial that the secret key or keys remain secret. Thus, in one embodiment of the method according to the present invention the user may receive the key by secure or secured communication with a server or another device. The server may be an external server, i. e. a server which is arranged at a different location than the electronic data processing system. The server may be a license server. The user does not permanently hold the key, but receives the key upon communication with the server, e.g. via a web interface. In this way the security of the identification protocol may be improved. For example, the user may be provided with login data to the server, and a login via the login data provided to the user may be no longer possible once the user is no longer considered as trusted. Alternatively, the user may be in possession of the response generation means, for example a portable electronic data processing means which is adapted for secure communication with the server. When the user is no longer considered as trusted, the possibility that the user communicates with the server may be terminated. This ensures that the user can no longer access the boot system once he is not considered as trusted any more.

Alternatively, the key may be obfuscated to ensure its secrecy. For example, the key may be stored in a local app in obfuscated form. For example, the key may be encrypted with another key. Alternatively, the key may be decomposed in several parts. These parts are used to compose the original key when the identification protocol is carried out. Alternatively, the key is made unreadable via certain logic operations. A combination of the three mentioned possibilities may be used.

To ensure security of the challenge-response protocol, a challenge which is random may be used. This may be ensured by using a challenge which is based on a random number. This may include pseudo random numbers. In one embodiment of the method according to the present invention said challenge may be generated in said boot system as a function of a boot system time and a random user input. For example, said boot system may be accessible upon pressing a key after starting of the electronic data processing system. In the boot system, time measuring means may start measuring the time from starting of the electronic data processing system until said key is pressed by the user. When the measurement of the time is sufficiently accurate, e. g. to an accuracy of milliseconds or microseconds, it is possible to generate a random number as a function of said measured time. Said challenge may be the generated random number.

In one embodiment of the method according to the present invention, the challenge may be device-dependent. For example, it may be based on a serial number or a MAC-address of the electronic data processing system and/or the boot system. In this case, the same challenge is generated for each instance of the challenge-response protocol, and, as a consequence, the response will always be the same. However, the challenge and the corresponding response will be different for two different electronic data processing systems. Thus, a control system could learn which electronic data processing system communicated the challenge. In this way, a log-file tracing the activities of the electronic data processing system over time could be created.

The challenge-response protocol according to the present invention requires communication of an ingoing message and an outgoing message between the boot system and the user. In one embodiment of the method according to the present invention said outgoing message communicating the challenge may be indicated in human readable or machine readable form on a first display associated with the boot system, the user may manually enter the displayed message into the electronic response generation means associated with the user and operable to display the generated response on a second display associated with the response generating means in human readable or machine readable form, and the user may manually enter the displayed response into the boot system as the ingoing message. To this end, the electronic response generation means may be connected with or comprise a keyboard. Additionally, or alternatively, the boot system may be connected with a keyboard. Alternatively, the response may be communicated to said boot system via machine-writeable methods. This may comprise Bluetooth, NFC, etc. Indicating or displaying the challenge and/or the response in machine readable form may comprise displaying the challenge and/or the response as a barcode or a QR-code.

The electronic data processing system may be or may comprise a personal computer or a laptop computer. Alternatively, said electronic data processing means may be used to control other devices. In one embodiment of the method according to the present invention said electronic data processing system may be operative to control the operation of a weighing scale and/or a point-of-sales terminal and/or a personal computer or computer device in a public or unprotected environment. Alternatively, said electronic data processing system may be operative to control the operation of a kiosk, an info terminal or a display. When the computer or laptop or other device is used in a public or unprotected environment, the computer or laptop or other device is thus protected against the possibility of unauthorized booting from an external storage medium.

According to another aspect of the present invention, there is provided an electronic data processing system operable under an operating system, the electronic data processing system comprising a boot system for selectively loading an operating system from one of a plurality of storage media, said boot system being accessible to an external user on execution of an identification protocol between said boot system and said user, said electronic data processing system comprising input means for receiving an ingoing message and output means for outputting an outgoing message characterized in that said identification protocol is a challenge-response protocol based on a challenge generated by said boot system, more particularly, based on a challenge randomly generated by said boot system, and communicated to said user in an outgoing message via said output means, and on verification of a response generated by said user on the basis of said challenge and received by said boot system via said input means as an incoming message generated by said user.

Everything that was said above in relation to the method for operating an electronic data processing system, including properties and parts of the electronic data processing system, the challenge-response protocol and the response generation means equally applies to the electronic data processing system. The electronic data processing system may be adapted to execute any aspect of the method given above.

In one embodiment, the electronic data processing system according to the present invention may comprise a Central Processing Unit (CPU). The electronic data processing system may comprise an x86 processor, an ARM processor or any other known processor.

Said challenge may be based on a fresh random number generated by a random number generator implemented in said boot system. Said challenge may be the fresh random number.

In one embodiment of the electronic data processing system according to the present invention, said generation of said challenge may be via execution of a challenge generation algorithm implemented in said boot system. Additionally, or alternatively, said verification of said response may be via execution of a verification algorithm implemented in said boot system.

In one embodiment of the electronic data processing system according to the present invention said boot system may comprise a BIOS or UEFI. Said generation of said challenge may be via execution of a challenge generation algorithm implemented in said BIOS or UEFI. Additionally, or alternatively, said verification of said response may be via execution of a verification algorithm implemented in said BIOS or UEFI.

The electronic data processing system may comprise a USB-port. The boot system may be configured to selectively load an operating system from a storage medium connected to said USB-port. The storage medium may be a USB-stick.

According to another aspect of the present invention there is provided a weighing scale comprising weighing means and an electronic data processing system according to any one of the aspects outlined above. The electronic data processing system may be operative to control the operation of said weighing scale.

According to another aspect of the present invention, there is provided an authentication system comprising an electronic data processing system according to any one of the aspects outlined above, and electronic response generation means for generation of a user response via electronic data processing.

BRIEF DESCRIPTION OF THE DRAWINGS

In the following description, the invention will be specified in greater detail by way of examples, with reference to the drawings, wherein identical parts are identified by identical reference numbers and wherein.

DETAILED DESCRIPTION OF THE DRAWINGS

Figure 1:
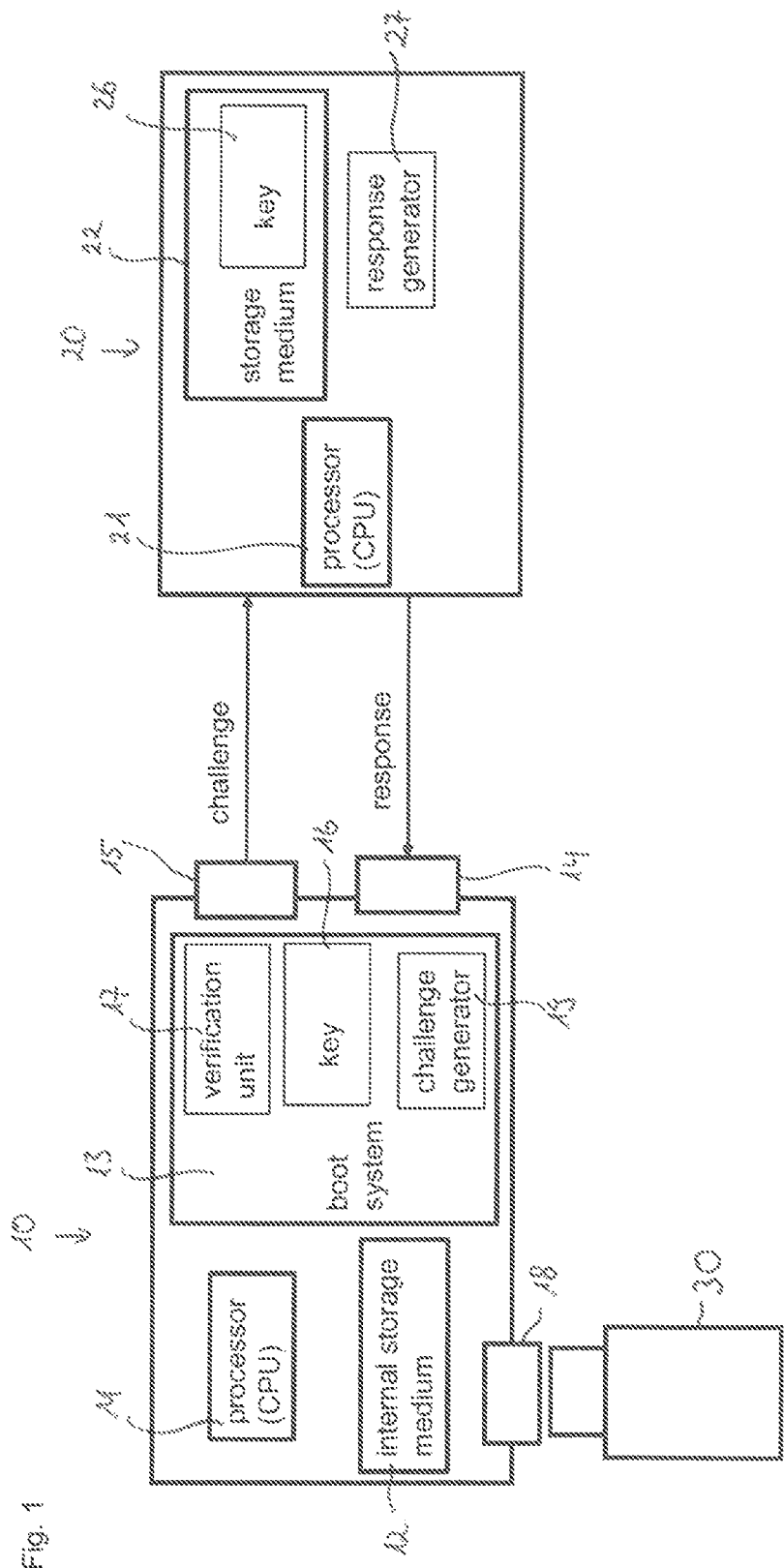
FIG. 1 is a schematic illustration of an electronic data processing system and response generation means according to the present invention.

FIG. 1 is a schematic illustration of an electronic data processing system 10 and response generation means 20 according to the present invention.

The electronic data processing system 10 comprises a Central Processing Unit (CPU) 11, an internal storage medium 12 and a boot system 13. A first operating system is stored on the internal storage medium 12. The CPU 11 may comprise an x86 processor or an ARM processor.

The electronic data processing system 10 further comprises at least one hardware interface 18 for communication with an external storage medium 30. The at least one hardware interface may comprise a USB-port 18. An external storage medium 30 may be connectable to the at least one hardware interface 18, thereby allowing data exchange between the external storage medium 30 and the electronic data processing system 10. In particular, a second operating system may be stored on the external storage medium 30, and the boot system 13 may be adapted to load the second operating system from the external storage medium 30. The external storage medium 30 may be a USB-stick or another storage medium connectable to the hardware interface 18, e. g. the USB-port.

The boot system 13 may comprise a BIOS or an UEFI. The BIOS or UEFI may be stored on a non-volatile memory.

The boot system 13 further comprises a verification unit 17 further specified below.

The electronic data processing system 10 and the response generation means 20 may be adapted to execute algorithms using electronic data processing. A challenge generation algorithm may be implemented in said boot system 13. To this end, the boot system 13 may comprise a challenge generator 19. For example, the boot system 13 may comprise a random number generator generating a random or pseudorandom number. In case that the boot system 13 comprises a BIOS or a UEFI, the random number generator may be implemented in the BIOS or UEFI of the boot system 13. The challenge generating algorithm may generate a challenge on the basis of the generated random number. The generated challenge may be a representation of the random number generated by the random number generator. The challenge generator may correspond to the random number generator.

The boot system 10 may communicate with output means 15 for communicating said challenge to the response generation means 20.

The response generation means 20 comprises a Central Processing Unit (CPU) 21, a storage medium 22 and a response generator 27. The response generation means 20 is held by a user.

A secret is provided to the response generation means 20. The secret may be a second key 26. The second key 26 may be stored in the response generation means 20. The second key 26 is not accessible to the public but it is secret. A response generation algorithm may be implemented in the response generator 27. The response generation algorithm accepts the challenge and the second key 26 as an input and generates a response. The response may be generated using a one-way function, e. g. a HMAC. The HMAC may involve a cryptographic hash function such as SHA-256.

The generated response is communicated to the boot system 13. The boot system 13 may communicate with input means 14 for receiving an incoming message containing the response generated by the user.

A verification algorithm may be implemented in the verification unit 17 of the boot system 13. The verification algorithm may be implemented in the BIOS or UEFI, if present. The verification unit 17 is adapted to verify whether the response generated by the response generator 27 is the correct response. To this end, a first key 16 may be stored in the boot system 13. The verification algorithm accepts the challenge, the response and the first key 16 as an input. For example, the verification algorithm may be based on the same HMAC as the one used by the response generation means 20, and the first key 16 may be identical to the second key 26. When the response is correct, access to the boot system 13 is granted, otherwise access to the boot system 13 is denied.

The first key 16 and the second key 26 may be identical. Then, the challenge-response protocol may be based on that shared symmetric key. Alternatively, the second key 26 may be a private key and the first key 16 may be a public key.

Figure 2:
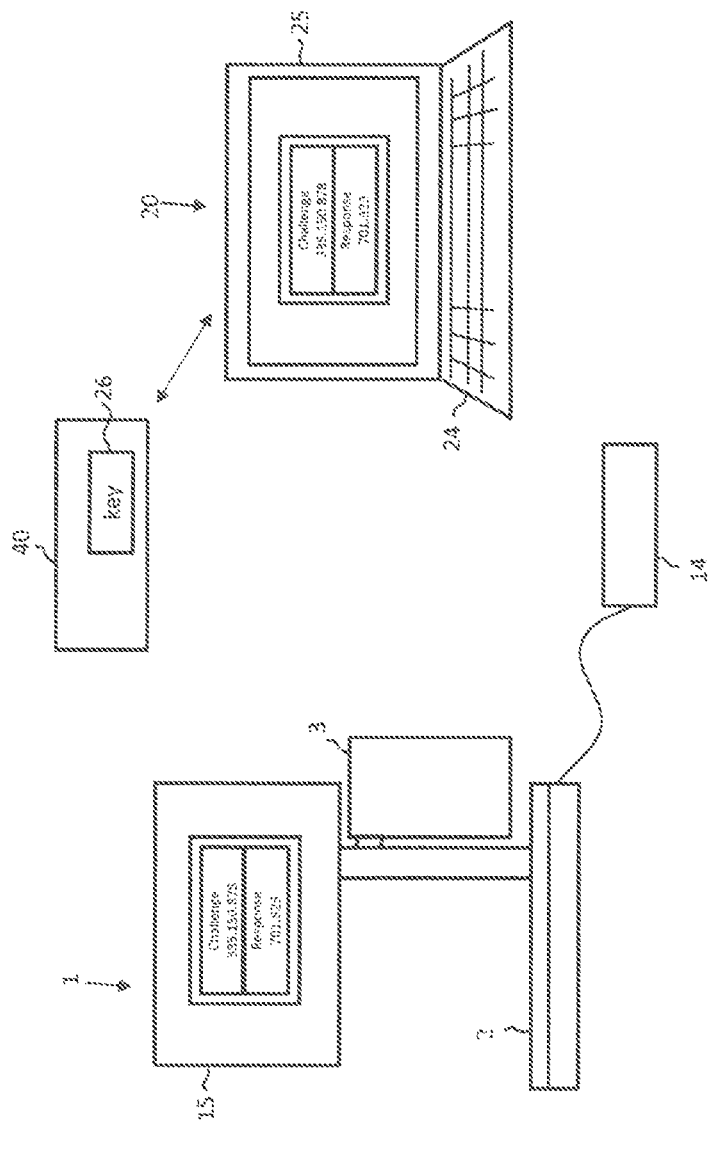
FIG. 2 is a schematic illustration of a weighing scale operated by an electronic data processing system according to the present invention and response generation means.

FIG. 2 is a schematic illustration of a weighing scale 1 operated by an electronic data processing system according to the present invention and response generation means 20. The weighing scale 1 comprises weighing means in the form of a load cell (not shown) and a load plate 2. Optionally, the weighing scale 1 may comprise a printer 3 for printing out weighing data.

The electronic data processing system operating the weighing scale 1 is similar to the electronic data processing system 10 shown in FIG. 1, and it is referred to the explanations above with reference to FIG. 1. The electronic data processing system 10 may comprise an x86 processor or an ARM processor.

The weighing scale 1 also comprises a first display 15. The first display 15 may correspond to the output means 15 mentioned above with reference to FIG. 1. The challenge is displayed on the first display 15 in human readable form, namely in the form of a number. In the embodiment shown in FIG. 2 the displayed number may be a representation of the random number generated by a random number generator implemented in said boot system.

A keyboard 14 may be connectable to said weighing scale 1. The keyboard 14 may allow a user input, e. g. to start the user identification protocol as outlined in more detail below. The keyboard 14 may correspond to the input means mentioned with reference to FIG. 1. The keyboard 14 may allow to enter the generated response mentioned below.

The weighing scale 1 may further comprise at least one hardware interface, e. g. a USB-port. The hardware interface may be connectable to an external storage medium. A second operating system may be stored on the external storage medium. For example, the external storage medium may be a USB-stick.

FIG. 2 further shows a response generation means 20 in the form of a laptop. The response generation means 20 may comprise all elements of the response generation means 20 of FIG. 1.

The laptop comprises a second keyboard 24. A user may read off the challenge displayed on the first display 15 of the weighing scale 1 and communicate the challenge to the response generation means 20 by inputting the challenge via the second keyboard 24.

As mentioned above, a second key may be stored on a storage medium of the response generation means 20. Alternatively, as depicted in FIG. 2, the second key 26 may be stored on a server 40, and the response generation means 20 may have access to the second key 26 via secure or secured communication with the server 40.

The laptop 20 comprises a second display 25. The second display 25 may display the response generated by the response generation means 20 in human readable form. In the embodiment shown in FIG. 2 the response is presented in the form of a number on the second display 25.

The response may be read off from the second display 25 by the user and entered into the boot system via the first keyboard 14. Then, depending on whether the entered response is correct or not, access to the boot system is granted or denied.

Figure 3:
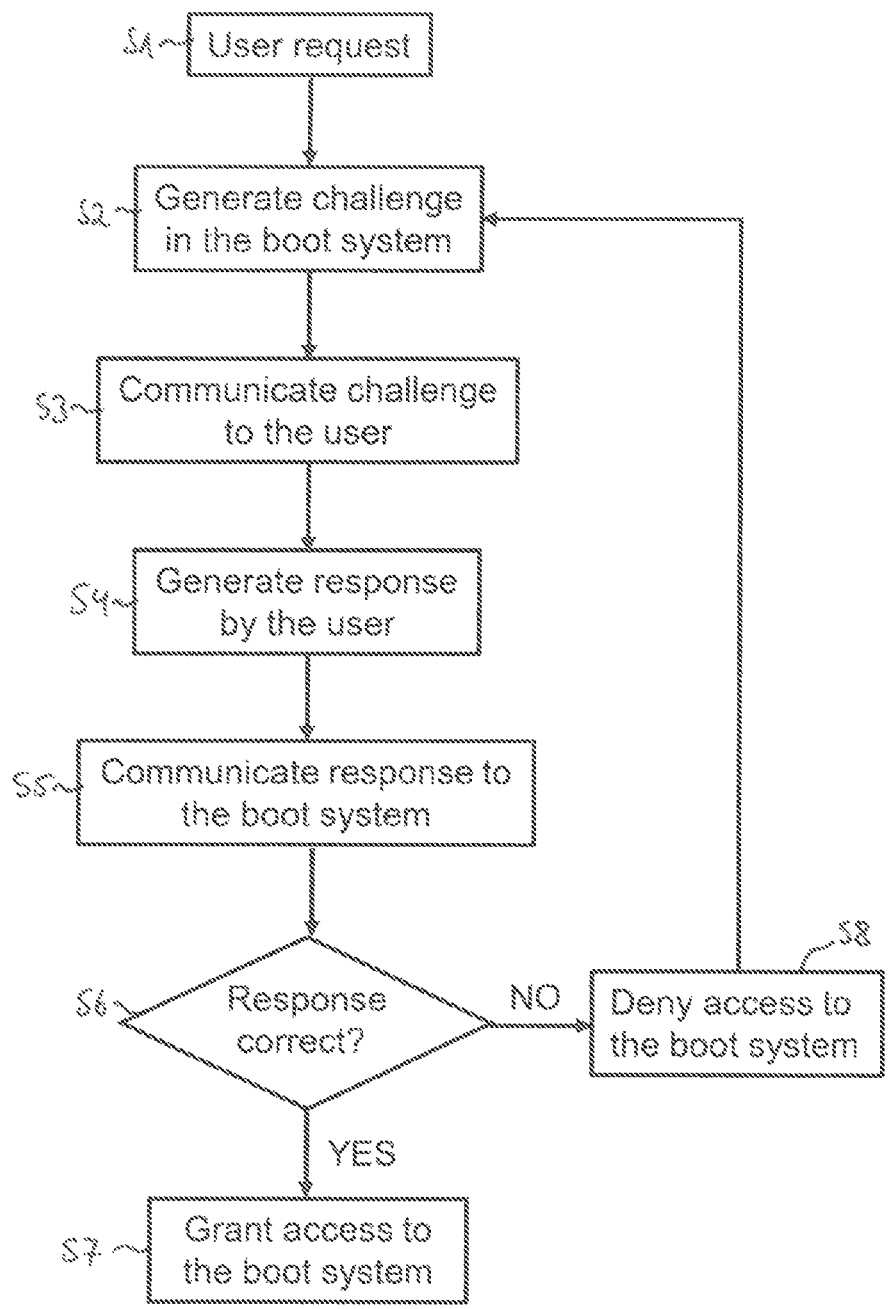
FIG. 3 is a flow chart of the method according to the present invention.

FIG. 3 illustrates an embodiment of the method according to the present invention. The method will be described by way of example with reference to the weighing scale 1 of FIG. 2.

The method starts with a user request for carrying out the identification protocol (S1). For example, the user may press at starting of the weighing scale 1 a certain key on the first keyboard 14. Said key, may be for example, DEL or F7.

Then, the boot system 13 generates a challenge, for example a random challenge (S2). The challenge may be represented by a bit string, e. g. only numbers. The challenge may be a representation of a random number generated in the boot system 13.

The challenge is communicated to the user (S3). E. g., the challenge may be displayed on the first display 15 of the weighing scale 1 in human readable form. For example, the bit string, e. g. a sequence of numbers, may be displayed on the first display 15. The user may read off the challenge from the display 15 and enter the challenge into the response generation means 20. For example, the user may use the second keyboard 24 to input the sequence of numbers displayed on the first display 15 into the response generation means 20.

Next, the response is generated by the user (S4). For example, the response generation means 20 may generate the response by executing a response generation algorithm as explained above. The response generation algorithm may accept the challenge and the second key 26 as an input. The challenge-response protocol may be based on symmetric-key techniques or public-key techniques. If the protocol is based on symmetric-key techniques, the second key 26 may be identical to the first key 16 (see below).

The generated response is then communicated to the boot system 13 via an incoming message (S5). For example, the response may be displayed on the second display 25 in human readable form. The user may read off the response and enter the response into the boot system 13, e. g. by using the keyboard 14.

The response is then verified by the boot system 13 (S6). For example, the boot system 13 may execute a verification algorithm implemented in said boot system 13. The verification algorithm may accept the challenge, the response and the first key 16 as an input, and verify whether the response inputted by the user is correct.

When the response is correct, the user is granted access to the boot system 13 (S7), otherwise the access is denied (S8). Then a new challenge may be generated (S2).

LIST OF REFERENCE SIGNS 1 weighing scale
2 load plate
3 printer
10 electronic data processing system
11 processor (CPU)
12 internal storage medium
13 boot system
14 first keyboard (input means)
15 first display (output means)
16 first key
17 verification unit
18 hardware interface (USB-port)
19 challenge generator
20 laptop
21 processor (CPU)
22 storage medium
24 second keyboard
25 second display
26 second key
27 response generator
30 external storage medium
40 server

What is claimed is:

1. A method for operating an electronic data processing system that operates an operating system, wherein the electronic data processing system comprises a boot system, accessible to an external user, for selectively loading an operating system from one of a plurality of storage media, the method for operating comprising:
- initiating the execution of an identification protocol, which is a challenge-response protocol, between the boot system and the external user by generating, in the boot system, a challenge and sending the challenge to the external user in an outgoing message;
- receiving, in the boot system, a response from the external user as an incoming message;
- verifying the received response on the basis of the sent challenge; and
- on verification, allowing the external user to select the storage medium from which the operating system is loaded.

2. The method of claim 1, wherein at least one of the following occurs:
- the challenge is generated in the boot system by a challenge generation algorithm implemented in the boot system;
- the received response is generated by using electronic data processing to execute a response generation algorithm implemented in an electronic response generation means operable by the external user; and
- the received response is verified by using electronic data processing to execute a verification algorithm implemented in the boot system.

3. The method of claim 2, wherein the challenge-response protocol is based on a symmetric key shared by the boot system and the external user.

4. The method of claim 3, wherein the challenge-response protocol is based on a one-way function that accepts as inputs the challenge and the shared symmetric key.

5. The method of claim 4, wherein the one-way function is a Keyed-Hash Message Authentication Code.

6. The method of claim 2, wherein the challenge-response protocol is based on a pair of asymmetric keys, a first of the pair of asymmetric keys being a public key accessible to the boot system and the second of the asymmetric keys being a private key used to generate the response.

7. The method of claim 3, wherein a server or another device provides the key to the external user by a secure or secured communication.

8. The method of claim 1, wherein the challenge is generated in the boot system as a function of a boot system time and a random input from the external user.

9. The method of claim 1, wherein the challenge is device-dependent.

10. The method of claim 2, wherein:
- the outgoing message communicating the challenge to the external user is indicated in human-readable or machine-readable form on a first display that is associated with the boot system;
- the message displayed on the first display is entered manually into the electronic response generation means, where the response is generated and displayed on a second display that is associated with the electronic response generating means, either in human readable or machine-readable form; and
- the generated response is entered into the boot system as an incoming message by either: manual entry into the boot system, or as a communicated to the boot system by a machine-writeable method.

11. The method of claim 1, wherein the electronic data processing system is operative to control, in a public or unprotected environment, the operation of at least one of: a weighing scale; a point-of-sales terminal, a personal computer or a computer device.

12. The method of claim 1, wherein the challenge is randomly generated by the boot system.

13. A system for electronic data processing, operable under an operating system, the system for electronic data processing comprising:
- an input means for receiving an incoming message;
- an output means for sending an outgoing message; and
- a boot system, configured to selectively load an operating system from one of a plurality of storage media, the boot system being made accessible for an external user to select the storage medium from which the operating system is loaded, after an identification protocol is executed between the boot system and the external user, the identification protocol comprising:
  - generating a challenge message by the boot system and communicating the challenge message through the output means as an outgoing message to the external user;
  - receiving a response message by the boot system through the input means as an incoming message, based on the challenge message; and
  - verifying the response message by the boot system.

14. The system of claim 13, wherein the boot system further comprises:
- at least one of a Basic Input/Output System (BIOS) or a Unified Extensible Firmware Interface (UEFI), the BIOS or UEFI having implemented thereon at least one of:
  - a challenge generation algorithm that is executed to generate the challenge message; and
  - a verification algorithm that is executed to verify the response message.

15. The system of claim 13, further comprising:
- a Universal Serial Bus (USB) port, configured for the boot system to selectively load an operating system from a storage medium connected thereto.

16. The system of claim 13, wherein the challenge message is randomly generated by the boot system.

17. A weighing scale, comprising:
- a weighing means; and
- an electronic data processing system according to claim 13.

18. An authentication system comprising:
- an electronic data processing system according to claim 13; and
- an electronic response generation means associated with an external user for generating a response via electronic data processing to a challenge from the electronic data system.

* * * * *